2 Sheets—Sheet 1.
LE GRAND SKINNER.
CUT-OFF VALVE GEAR.
No. 10,405. Reissued Nov. 6, 1883.
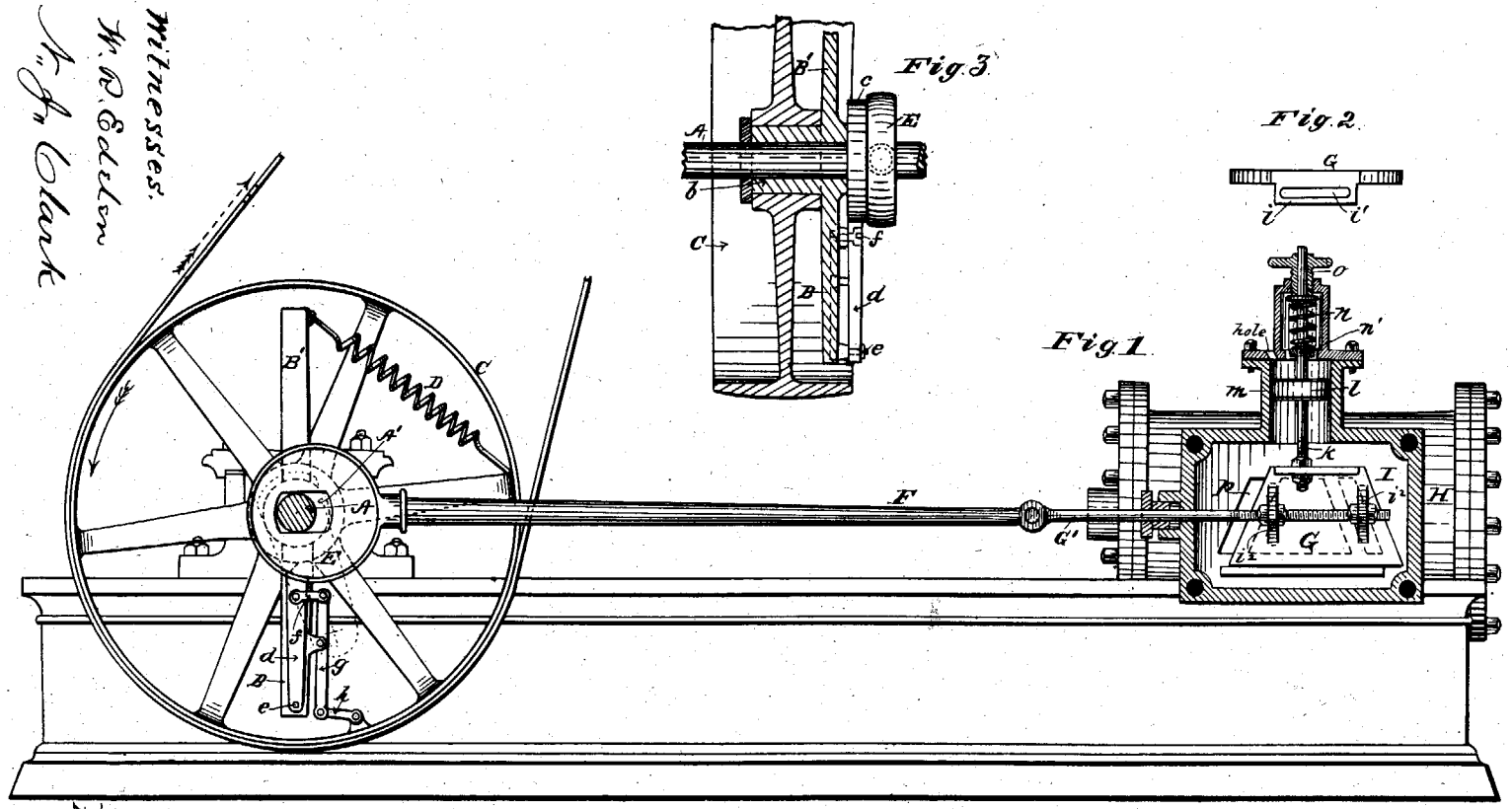
Witnesses.
W. R. Edelen
N. J. Clark
Inventor
LeGrand Skinner
Per
J. H. Sturgeon
Att'y 2 Sheets—Sheet 2.
LE GRAND SKINNER.
CUT-OFF VALVE GEAR.
No. 10,405. Reissued Nov. 6, 1883.
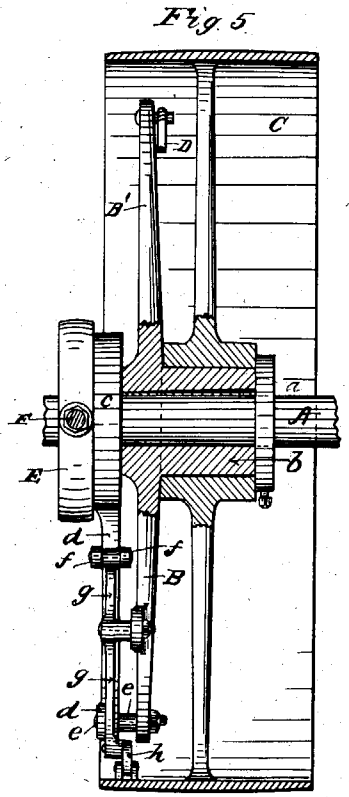
Fig. 5
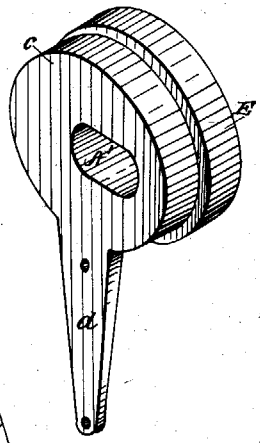
Fig. 6.
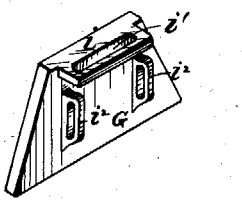
Fig. 2½
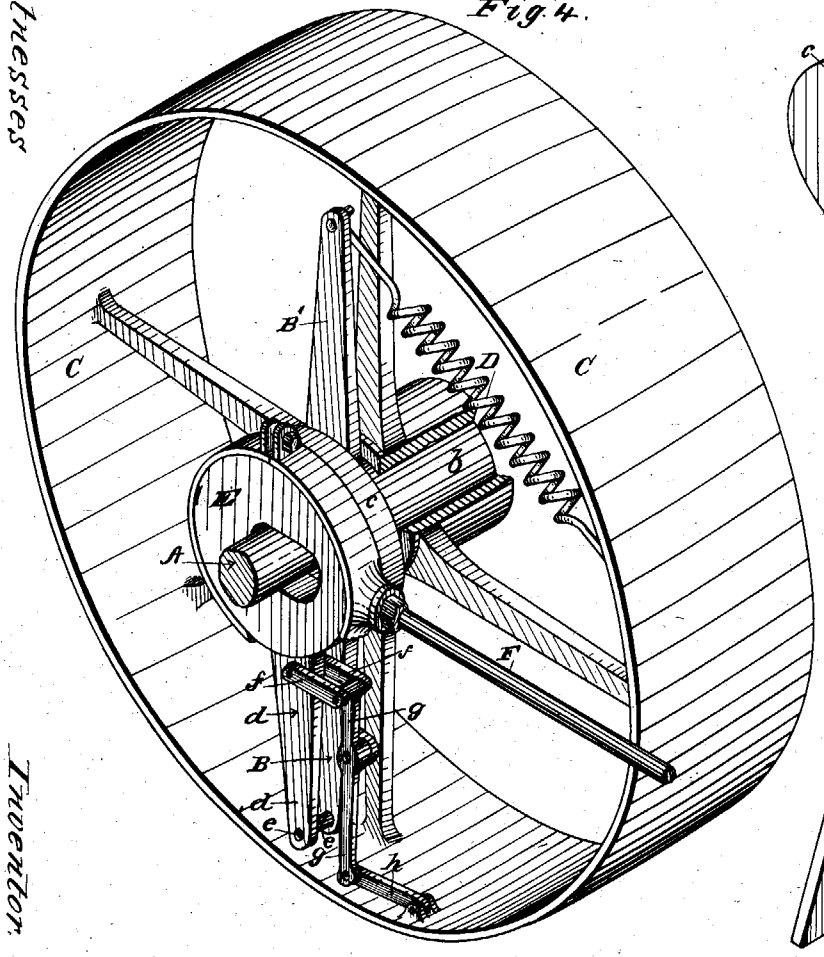
Fig. 4.
Witnesses
H. R. Edelen.
N. J. Clark
Inventor.
Le Grand Skinner.
Per J. H. Sturgeon
Atty

UNITED STATES PATENT OFFICE.

LE GRAND SKINNER, OF ERIE, PENNSYLVANIA.

CUT-OFF-VALVE GEAR.

SPECIFICATION forming part of Reissued Letters Patent No. 10,405, dated November 6, 1883.

Original No. 282,388, dated July 31, 1883. Application for reissue filed August 27, 1883.

*To all whom it may concern:*

Be it known that I, LE GRAND SKINNER, a citizen of the United States, residing at Erie, in the county of Erie and State of Pennsylvania, have invented certain new and useful Improvements in Governors for Steam-Engines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to improvements in governors and cut-off-valve gear for steam-engines, in which dynamic governors act and operate in conjunction with steam-pressure cylinders, thereby regulating the supply of steam to and the speed of the engine.

The objects of my invention are, first, to govern the speed of an engine by the load it is carrying operating on a dynamic governor or regulator, in conjunction with a pressure-regulator operated by steam-pressure by means of mechanism connecting the said regulators with and operating the variable cut-off valve of said engine; second to produce in a steam-engine a dynamic governor having variable cut-off-valve gear and a regulator actuated by steam-pressure, both said governor and regulator being automatic in operation, and in operative connection with a variable cut-off valve, whereby the movement of the steam-valve and supply of steam to the cylinder are regulated by the varying load of machinery and the varying steam-pressure acting through and upon the steam-valve; third, to construct a steam-engine having a dynamic governor and a steam-pressure cylinder, both acting automatically upon the cut-off valve and controlling the movement thereof, whereby the supply of steam to the engine is regulated and controlled. I attain these objects by the mechanism illustrated in the accompanying drawings, forming part of this specification, in which—

Figure 1 is a side elevation, partly in section, of portions of an engine embodying my invention. Fig. 2 is a top view of the main valve of the engine. Fig. 2½ is a perspective view of the main valve of the engine. Fig. 3 is a detail view of part of the loose driving-pulley and connections. Fig. 4 is a perspective view of the loose driving-pulley and mechanism connecting the same to the shaft and variable eccentric. Fig. 5 is a section through the same, showing the arrangement of parts in detail. Fig. 6 is a perspective view of the variable eccentric as seen from its obverse side.

Like letters of reference indicate like parts in all the figures.

There is nothing novel in the engine to which my improvements are applied, as they may, with equal facility, be utilized in the construction of nearly or quite all styles of engines, my improvements consisting in the utilization of the steam-pressure in connection with any ordinary dynamic governor for controlling the speed of the engine.

Heretofore engines have been constructed having dynamic governors which govern the speed of the engine by the load carried and the variations of load; also, engines having centrifugal governors which approximately accomplish similar results. However, by my invention I not only utilize the load carried and get equal results in governing the speed of the engine by its load and the variations thereof, but at the same time utilize any variations in the steam-pressure for a like purpose, in my invention the dynamic governor and the steam-pressure cylinder acting conjointly for and in the governing of the speed of the engine and maintaining any given rate of speed desired continuously, regardless of variations in either the load or steam-pressure, or variations in both, thereby accomplishing better and more satisfactory results.

In the drawings, A is the engine-shaft, to which is secured the rigid arm B, having a hub, *b*, upon which the loose driving-pulley C is placed. To a similar fixed arm, B′, a spring, D, or other flexible connection is attached at one end, the other end being connected with the arm of the loose pulley C, so as to form a tension or dynamic connection.

The eccentric E is constructed with a hub, *c*, having an arm, *d*, which is pivoted to the rigid arm B at *e*. The eccentric E has also cut through it at right angles to the arm *d* an oblong slot, A′, which permits the eccentric E, pivoted on its arm *d*, to be moved across the shaft A, to vary the throw of the valve. To the arm *d* of the eccentric is pivoted a link, *f*, which connects it with the upper end of the lever *g*. This lever *g* is pivoted at or near its center to the fixed arm B, and at its lower end is attached to a link, *h*, the other end of which link is connected to a lug on the inside of the rim of the loose pulley C, the action of this mechanism being to shift the eccentric E across the shaft A, as the load is increased or diminished, by the greater or less tension of the belt on the driving-pulley C, as shown by the dotted arrow in Fig. 1.

The eccentric-rod F is connected to the valve-stem G′ in the usual manner. The valve-stem G′ passes through an ordinary stuffing-box into the steam-chest I, and is attached to the valve G by passing through the slots $i^2$ (see Fig. 2½) and having nuts or collars on either side of the slots $i^2$, (see Fig. 1,) so as to permit of a vertical movement of the valve G upon the valve-rod G′.

The valve G is constructed with oblique sides, and the ports *p* in the cylinder H are constructed at a like angle with the sides of the valve G. The valve G has also along its upper side a lug, *i*, provided with a slot, *i′*.

Upon the top of the steam-chest I is constructed a steam-pressure cylinder, *m*, which is open below and communicates with the steam-chest I or other portion of the engine, so as to receive steam at boiler-pressure and be operated thereby. In this pressure-cylinder is a piston, *l*, having piston-rod *k*, the lower end of which passes through the slot *i′* in the top of the valve G, and is secured therein by collars or nuts, as shown in Fig. 1, so that it will move through the slot *i′* longitudinally. The upper end of the piston-rod *k* passes through the hollow nut O in the upper end of the cylinder *m*, and has around it a spiral spring, *n*, the upper end of which bears against the nut O, and the lower end rests upon a bearing, *n′*, on the piston-rod *k*. The nut O, operating upon the spring *n*, serves to increase or diminish the tension of the spring *n*, by which the action of the piston *l* is regulated, the piston *l* operating the valve G vertically, while the dynamic governor on the engine-shaft operates it longitudinally. In this way the varying load on the driving-pulley will vary the cut-off of the main valves of the engine in proportion to the power required, while at the same time any changes in the steam-pressure will cause the piston *m* to raise or lower the valve G, thereby diminishing or increasing the openings of the ports *p*, as the case may be, thus accomplishing results not attainable with the dynamic governor alone, thus uniting the results obtained by the use of a dynamic governor with the results obtained from the steam in the pressure-cylinder, so that either one or both at the same time act to control the amount of steam supplied to the engine-cylinder, and thereby regulating and controlling the speed of the engine.

I have thus far shown and described a simple means and plan for utilizing my invention. However, instead of one valve, as shown in the drawings, two or more valves may be employed; or separate main and cut-off valves may be used, if desired.

I do not limit myself to the particular construction, and arrangement of parts herein shown and described, as many different devices and forms of construction and arrangement will readily suggest themselves to a mechanic desiring to utilize my invention, and thereby accomplish the same results as I do.

I am aware that pendulum-governors have been heretofore used in connection with pressure-cylinders operated by water-pressure from a main; but in a steam-engine these are not so efficient and sensitive as a dynamic governor used in conjunction with a steam-pressure cylinder, whereby I attain better and more satisfactory results.

The operation of my invention is obvious, and will be readily understood from the foregoing description by those conversant with steam-engines and their construction without further explanation.

Having thus described my invention, what I claim, and desire to secure by Letters Patent, is—

1. In a steam-engine, the combination of a dynamic governor on the shaft of the engine with a regulator actuated by steam-pressure off the shaft, said governor and regulator being geared to coact in the automatic regulation of the variable cut-off valve for governing the speed of said engine, substantially as set forth.

2. In a steam-engine, a variable cut-off valve which is acted upon to automatically vary the cut-off by two separate regulators, one of which is mounted upon the shaft and acts dynamometrically to regulate from the variations in the load upon the driving pulley, and the other is mounted off the shaft of the engine, and is operated by steam-pressure to regulate the speed of the engine, substantially as set forth.

3. In a steam-engine, the combination of a dynamic regulator on the shaft of the engine, having variable cut-off-valve gear, with another regulator actuated by steam-pressure off the shaft, said regulators operating (the first from the varying load, and the second from the varying steam-pressure) in the automatic regulation of the variable cut-off valve, to govern the speed of said engine, substantially as set forth.

4. In a steam-engine, a dynamic governor on the engine-shaft, actuated by the load carried, acting in combination with a regulator actuated by steam-pressure, both the governor and regulator being connected with the valve which serves to regulate the amount of steam to the engine-cylinder, the movement of the said valve being thereby controlled both by the load carried and the steam-pressure, substantially as set forth.

5. In a steam-engine, a dynamic governor on the main shaft of the engine, and connected by variable cut-off-valve gear to a valve, G, in combination with a steam-pressure cylinder containing a piston connected with the same valve, the two jointly or separately operating and regulating the movement of said valve by the varying load and the varying steam-pressure, substantially as and for the purpose set forth.

6. In a steam-engine, a steam-pressure cylinder containing a spring regulating the movement of the piston therein, in combination with the dynamic governor on the engine-shaft, said governor and steam-piston being connected to and operating the same valve, and operating conjointly or separately in automatically moving said valve for regulating the amount of steam admitted to the engine-cylinder, substantially for the purpose set forth.

7. The combination of a dynamic governor, constructed substantially as described, with a valve, G, having oblique sides, and provided with a rod, *k*, piston *l*, spring *n*, and regulating-screw, substantially as specified.

8. In an engine, a valve, G, having oblique sides, and provided with a lug, *i*, having slot *i'*, and connected to a piston, *l*, in the pressure-cylinder *m*, substantially as and for the purpose set forth.

9. The combination of the valve G, having oblique sides, and connected to a steam-piston, *l*, in a pressure-cylinder, *m*, with a steam-engine cylinder, H, having inclined ports *p*, as shown, and the variable cut-off gear consisting of the variable eccentric and dynamic governor on the main shaft, operatively connected therewith, as and for the purpose set forth.

10. In an engine, the combination of a dynamic governor on the engine-shaft, with a governor actuated by steam-pressure and arranged on or near the engine-cylinder, and mechanism whereby the valve is controlled by one or both devices, substantially as set forth.

In testimony whereof I affix my signature in presence of two witnesses.

LE GRAND SKINNER.

Witnesses:
W. R. EDELEN,
C. SWALLEY.